United States Patent Office 3,524,523
Patented Aug. 18, 1970

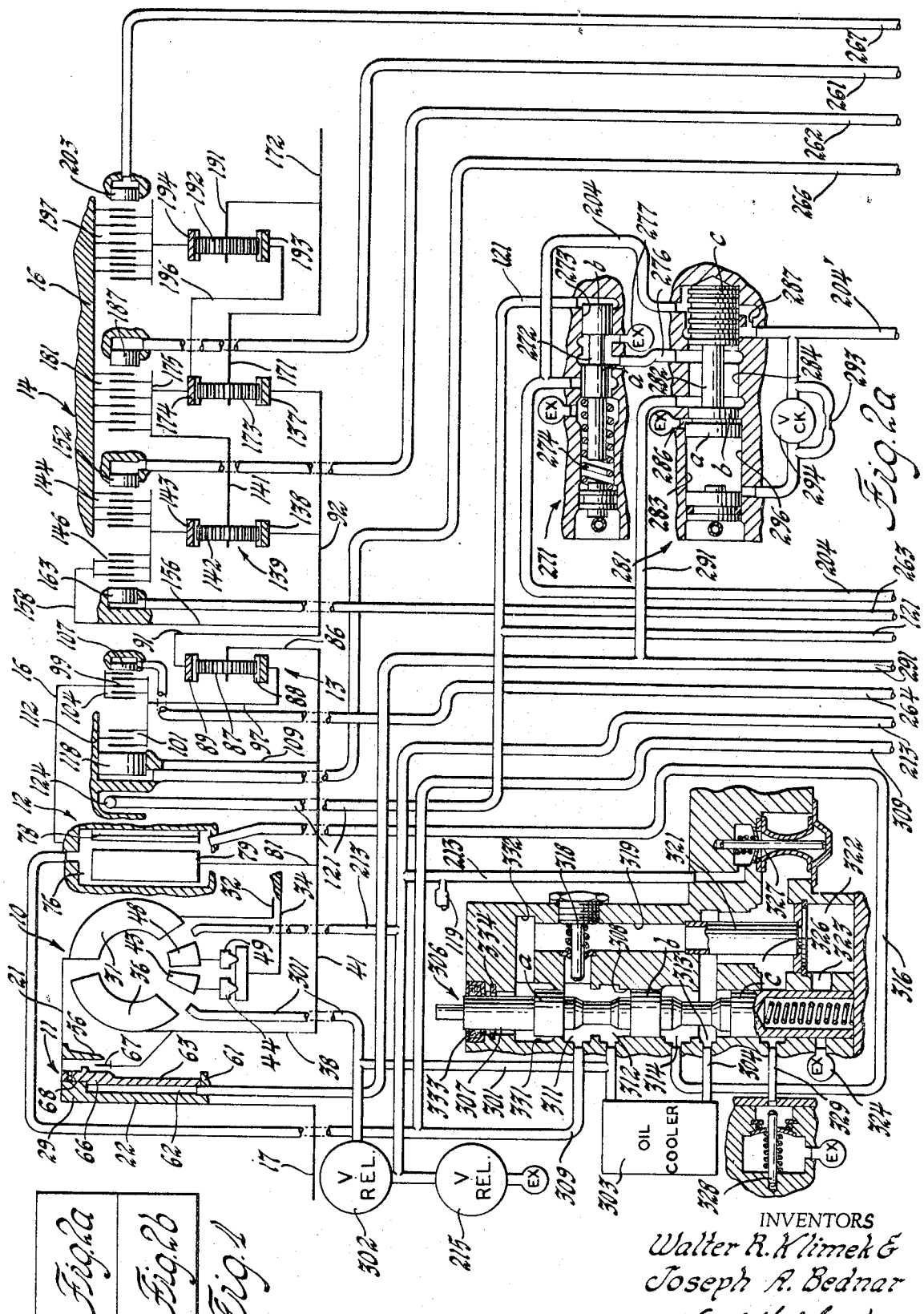

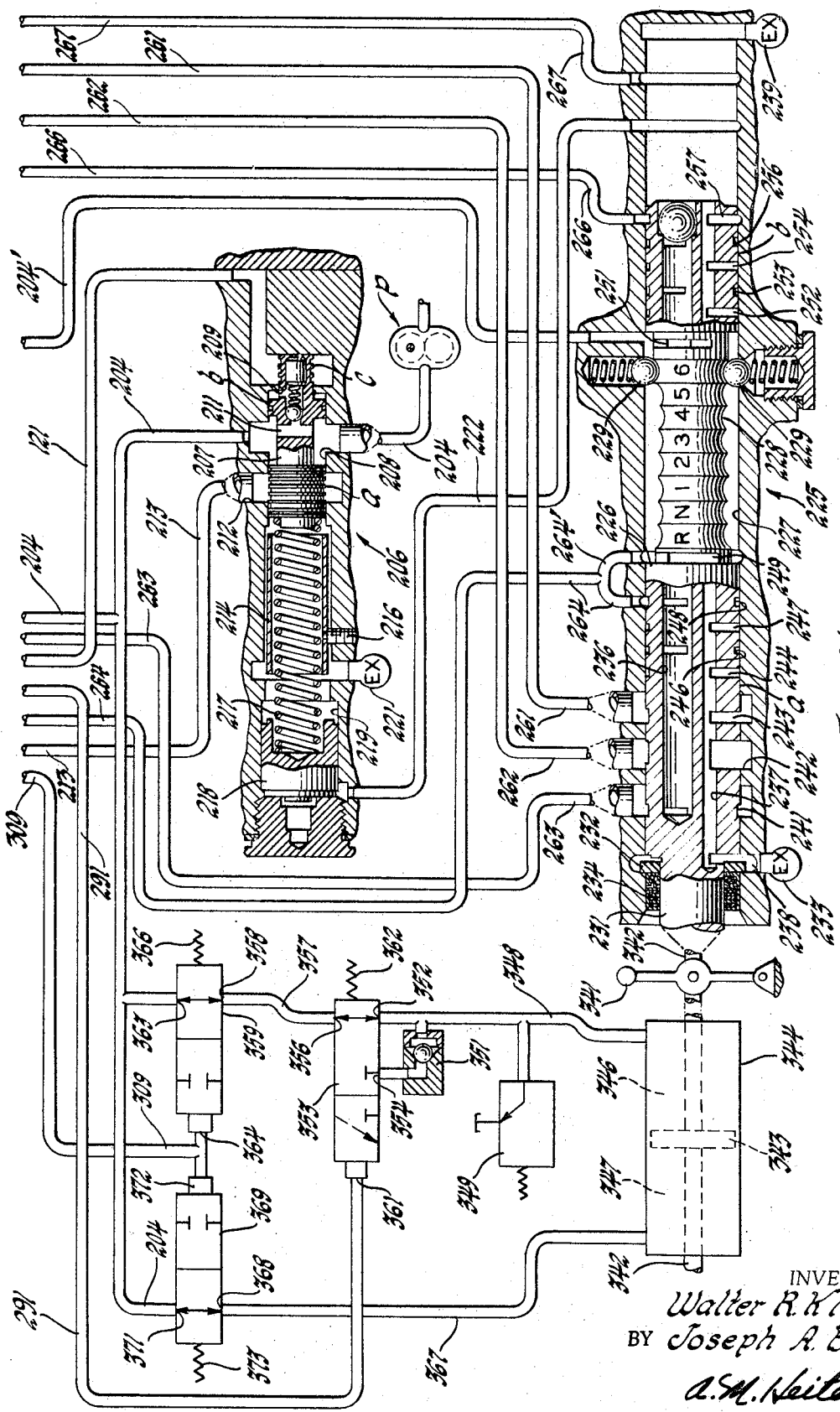

3,524,523
TRANSMISSION-CLUTCH-BRAKE CONTROL WITH SHIFT INHIBITOR AND DETENT
Walter R. Klimek, Cuyahoga Falls, and Joseph A. Bednar, North Olmsted, Ohio, assignors to General Motors Corporation, Detroit, Mich., a corporation of Delaware
Filed May 24, 1968, Ser. No. 731,970
Int. Cl. F16d 67/00
U.S. Cl. 192—4
8 Claims

ABSTRACT OF THE DISCLOSURE

A control system shift inhibitor and detent for use with a multi-ratio power transmission having a lockup clutch and a hydrodynamic brake is herein disclosed in which a manual ratio change shift valve is connected to an expansible fluid device having two chambers which are filled with a substantially incompressible fluid which may be freely transferred, through fluid passages and pilot operated valves, from one chamber to the other when a ratio change is to be permitted. The pilot operated valves are operatively connected, by signal lines, to the lockup clutch and the hydrodynamic brake such that, when the hydrodynamic brake is operative, the fluid passages are closed thereby creating a "fluid lock" in the expansible fluid device to prevent movement of the manual valve and, when the lockup clutch is engaged, the fluid passages are closed in one direction to prevent movement of the manual valve in one direction. A detent is also provided which will permit the operator, with the use of sufficient force, to move the manual valve in one direction even though the fluid passages are closed.

---

This invention is related to multi-ratio power transmission controls and more particularly to the shift inhibitor controls for such transmissions.

Many torque convertor power transmissions use a lockup clutch to provide a direct drive from the engine to the gearing thereby bypassing the torque convertor for increased efficiency and a hydrodynamic brake to provide vehicle braking. However, it is not desirable to change drive ratios while the hydrodynamic brake is in operation since a downshift may cause engine overspeeding while an upshift will reduce the effectiveness of the brake. Also, downshifting of the transmission while the lockup clutch is engaged may cause the engine to "lug-down" and possibly stall.

Therefore it is an object of this invention to provide a control which will inhibit ratio change while the hydrodynamic brake is in operation.

A further object of this invention is to provide in a transmission control a downshift inhibitor operative to prevent a downshift while the lockup clutch is engaged.

Another object of this invention is to provide in a control a detent to override the shift inhibitor and permit forced downshifting.

These and other objects of the invention will be more apparent from the following description and drawings of the preferred embodiment.

FIGS. 2a and 2b, when arranged in accordance with FIG. 1, show the transmission assembly and the control system therefor.

The transmission drive train shown diagrammatically in FIG. 2a includes a torque convertor 10, a lockup clutch 11, a hydrodynamic brake 12, a two-speed splitter gear unit 13, and a three-speed and reverse main gear unit 14, all located in the transmission housing 16 and is shown in detail in the U.S. Pat. No. 2,978,928, Robert M. Tuck and Mark E. Fisher. Referring to FIG. 2a, the engine shaft 17 rotatably mounted in suitable bearings is connected to rotatably drive the torque convertor housing 21 which has a rear curved portion to which the convertor pump blades 31 are attached and a hub 32 which may be supported on ground sleeve 34 is secured to the transmission housing 16. The torque convertor pump blades 31 circulate the fluid counter-clockwise to the turbine blades 36 which drive via an output hub 38 the convertor output shaft 41. When the fluid leaves the turbine blades 36, it is redirected during high torque multiplication by the blades of the first stator which is connected by a one-way clutch 44 to the ground sleeve 34. The fluid is, during all torque multiplication, redirected by the blades of the second stator element 48 which is connected by one-way clutch 49 to the ground sleeve 34.

The lockup clutch 11 has a fixed plate 56 rotatably and axially secured adjacent the front wall 22 of housing 21. The front wall 22 also has between the outer cylindrical portion 29 and an inner cylindrical portion 61, an annular cylinder 62 for the lockup clutch piston 63. The hydraulic pressure in the convertor chamber, without the assistance of a spring, returns the piston 63. The piston 63 has a pressure plate portion 66 which engages the driven clutch plate 67 between itself and the fixed plate 56 to engage the lockup clutch. The driven plate 67 is apertured to permit fluid passage therethrough and suitably connected to the output hub 38 and output shaft 41. At a near stall, the pressure in cylinder 62 may rise higher due to centrifugal pressure head than the pressure in the convertor chamber which at stall has a low centrifugal pressure head to tend to engage the clutch. To avoid this, piston 63 has a restricted bleed hole 68 at the outer diameter to permit exhaust of fluid from the cylinder to the convertor chamber to reduce the pressure in cylinder 62 by equalizing pressure at the bleed when the supply of control fluid is stopped to permit the pressure in the convertor chamber to retract and hold the piston for disengagement of the lockup clutch. The bleed is not large enough to interfere with the proper buildup of pressure in cylinder 62 on the supply of control fluid to engage the clutch or may be placed in a position to be closed by the clutch driven plate when the clutch is engaged.

The hydraulic pump P and any other engine driven accessories may be driven by gearing connected to hub 32 of the torque converter housing 21.

The hydrodynamic brake unit 12 is located between the torque convertor 10 and the front or two-speed splitter gear unit 13 in a chamber 76 provided in the transmission housing 16. An annular series of radial vanes 78 which provide the stator element of the hydrodynamic brake are located in brake chamber 76 and fixed to housing 16. The rotor element of the hydrodynamic brake consists of an annular series of radial vanes 79 mounted on a hub 81 secured to the torque converter output shaft 41.

The convertor output shaft 41 drives the two-speed gear unit 13. This single planetary type gear unit has a carrier 86 splined to the shaft 41 to provide the input element for this gear unit. The carrier has a plurality of planetary pinions 87 which mesh with a sun gear 88 and a ring gear 89 which is suitably connected by a hub 91 to the intermediate shaft 92 or output member of this gear unit. The sun gear 88 is connected to the control hub 97 which may be stopped by the overdrive ratio change device or brake 99 to provide an overdrive ratio or connected to the drive shaft 41 by a direct drive clutch 101 and hub 109 to provide direct drive in this gear unit. The brake 99 has conventional alternate fixed plates splined to the housing 16 and moving plates splined to the hub 97, located between a fixed abutment 104 formed as a portion of the housing 16 and the annular piston of motor 107 formed in a portion of the housing 16. Since the piston engages a nonrotatable clutch plate, it is not necessary to provide the usual stop member such as a pin to prevent rotation of the piston and the other ground clutch pistons described below. A return spring, not shown, returns the piston to the released position. The direct drive clutch 101 is mounted on hub 109 splined to shaft 41 and has driven plates splined to the hub 97 and drive plates splined to an axial flange portion 112 of the hub 109, located between a fixed abutment and the motor 118 on the hub 109. The piston of motor 118 is returned by a retraction spring not shown.

The pitot governor 124 has an annular chamber formed by a part of flange 112 which rotates with the hub 109 and shaft 41. Fluid is supplied to the chamber by line 121, which has a terminal end located to spray fluid through the opened internal side of the chamber. The fluid is retained in the chamber by centrifugal force and rotates with the chamber toward the open end of the pitot tube to provide a governor pressure in line 121 proportional to the speed of shaft 41.

The intermediate shaft 92 connects the front unit 13 to the rear or three-speed unit 14, and drives a first sun gear 137 and the second sun gear 138 of the compound planetary three-speed unit 14. The second planetary gear set 139 has a carrier 141 carrying a plurality of planetary pistons 142 which mesh with the second sun gear 138 and the ring gear 143. The ring gear 143 is controlled by a ratio change device or brake 144 to provide intermediate ratio and by a direct drive clutch 146 to provide direct or high ratio in this unit. The brake 144 has alternate rotating plates splined to the ring gear 143 and intermediate fixed plates splined to the housing 16 which are located between a fixed abutment secured to the housing and an annular piston of motor 152 formed in a portion of the housing 16. Retraction springs, though not shown, are employed to return the piston to the released position.

The direct drive clutch 146 is located in a hub 156 splined to the intermediate shaft 92. This clutch has alternate plates splined to the ring gear 143 and intermediate plates splined to the cylindrical flange 158 formed as an extension at the outer diameter of the hub 156. The plates are located between a fixed abutment secured to the flange 158 and the piston of motor 136. A retraction spring not shown returns the piston of motor 163.

The first planetary gear set of the three-speed compound planetary unit 14 has a carrier 171 connected to the output shaft 172 and carries a plurality of planetary pinions 173 meshing with the sun gear 137 and the ring gear 174. The ring gear is connected by hub 175 to the carrier 141 which is rotatably supported by the gearing or suitable thrust bearing on the intermediate shaft 92. The ring gear 174 is retarded to provide low ratio in the three-speed unit by a brake 181 which has a set of plates three-speed unit by a brake 181 which has a set of plates having alternate plates splined to hub 175 of ring gear 174 and intermediate plates splined to housing 16. This set of plates is located between a fixed abutment and a piston of motor 187.

The reverse gear unit has a carrier 191 fixed to the output shaft 172 and carries planetary pinions 192 meshing with the sun gear 193 and the ring gear 194. The sun gear 193 has a hub 196 extending radially outward and having a connection to the ring gear 174 which provides a unitary assembly consisting of the sun gear 193, the ring gear 174 and the carrier 141. The ring gear 194 is stopped to provide reverse by the reverse brake 197 which has a set of plates with alternate plates splined to the ring gear 194 and intermediate plates splined to housing 16. The plates are located between a fixed abutment and a piston of motor 203.

The front or two-speed unit provides a direct drive and overdrive which, when used in combination with each of the three forward ratios and reverse provided in the rear or three-speed unit 14, produces a transmission providing six forward speeds and two reverse ratios. In the front unit 13 the direct drive is provided by engaging the direct drive clutch 101 which connects the convertor output shaft 41 and the sun gear 88 together to lock up the planetary gear unit to provide direct drive which is the lower ratio. An overdrive ratio is provided by engaging the brake 99 which holds the sun gear stationary so that the input carrier 86 drives the output ring gear 89 at an overdrive ratio. In the rear unit when the low brake 181 is engaged to hold the ring gear 174, the input sun gear 137 drives the planetary carrier 171 and output shaft 172 at a low ratio. When the intermediate brake 144 is engaged, the ring gear 143 is held stationary so that the intermediate shaft 92 and sun gear 138 drive the planetary carrier 141 forwardly at a reduced speed, and this carrier drives the ring gear 174 which, in combination with the intermediate shaft 92 driving sun gear 137, rotates the carrier 171 at an intermediate ratio. High ratio or direct drive in the rear unit 14 is provided by engaging clutch 146 which connects the intermediate shaft 92 to the ring gear 143 to provide a direct drive. Reverse drive is provided by engaging the clutch 197 to hold the ring gear 194. Then the sun gear 137 drives the ring gear 174 reversely since the carrier is stationary or moving reversely to impart a reverse drive to the sun gear 193 which drives the carrier 191 and output shaft 172 at a reduced reverse ratio. It will be appreciated that only one clutch is applied in each unit to provide one drive ratio in each unit and that the other clutches must all be disengaged. This gearing on the application of one clutch in the rear unit to provide either high, intermediate, low or reverse ratios and one clutch in the front unit to provide either direct drive or overdrive provides six forward ratios and two reverse ratios.

Fluid pressure for the hydraulic control system is supplied by the input driven pump P to the main line 204 which is regulated by the main line regulator valve 206. The main line regulator valve element 207 has lands $a$ and $b$ of equal diameter located in a bore 208 and a smaller diameter land $c$ located in the smaller bore 209. Fluid pressure from the main line 204 passes through the passage 211 which has a check valve therein permitting full flow into the passage and restricted flow out of the passage to permit a damped supply of fluid to act on the land $b$ to move the valve element 207 to the exhaust position connecting main line 204 to exhaust port 212 which is connected by convertor supply line 213 to supply fluid to the torque convertor operating chamber, the pressure of which is limited by a relief valve 215 connected to exhaust. Movement of the valve element in this direction is limited by a sleeve 214 positioned by pin 216. A spring 217 biases the valve element 207 to the closed position shown. The spring abuts a movable abutment piston 218 mounted in a suitable limited length cylinder portion 219. Exhaust 221 vents the spring chamber. Governor pressure via line 121 is connected to act on the land $c$ to reduce line pressure with increasing governor pressure. The signal line 222 supplies fluid in certain shift positions to cylinder 219 to move the piston 218 to increase the spring biasing force and line pressure in first and reverse positions of the manual shift valve.

The manual valve 225 has a valve element 226 having lands $a$ and $b$ located in a bore 227 for reciprocal movement to the reverse, neutral and first through sixth ratio positions. The valve positioning grooves 228 are designated as R, N, 1, 2, 3, 4, 5 and 6. The valve is located in the corresponding position when the ball detents 229 engage the respective grooves. The valve element 226 has a reduced actuating portion 231 extending through a C washer 232 located in the exhaust port 233 which engages the shoulder of land $a$ to limit movement of the valve. The seal 234 prevents leakage of fluid beyond exhaust 233. Valve element 226 has a high pressure bore 236 which is closed at both ends and a low pressure or exhaust bore 237 which is open at both ends. At the actuating end it is opened via the exhaust port 238 and at the other end it is directly opened at the end face of the valve element 226. The bore in the body is exhausted at the ends by exhaust ports 233 and 239. The valve element also has a plurality of high pressure ports. Enumerating from the operating end, there is a high pressure supply port 241, a wide exhaust port 242, an exhaust port 243, an exhaust port 244, a supply port 246, an exhaust port 247 and a supply port 248 all in land *a*. Between the land *a* and the reverse groove, there is a supply port 249. Between groove 6 and land *b*, there is a supply port 251. Continuing in land *b*, there is an exhaust port 252, a supply port 253, an exhaust port 254, a supply port 256 and a low exhaust port 257. The ports in the valve body are referred to by the same numeral as the connecting line. Note that the ports of lines 261, 262 and 263 are double width ports to provide connections in two successive valve positions.

In all valve positions, the main line 204' is connected via port 251 to the space between lands *a* and *b*, the supply bore 236 and the connected supply ports.

In the sixth ratio position shown, main line 204' is connected via bore 227 and branch line 264', to line 264 and motor 107 to engage brake 99 thereby establishing the high ratio in the splitter unit, and via supply port 251, bore 236 and supply port 241 to line 263 and motor 163 to engage direct drive clutch 14 thereby establishing the high ratio in the rear unit. In fifth ratio position, with the detent balls engaging groove 5, line 263 for high ratio in the rear unit remains connected as described above, and the supply port 256 is connected to supply line 266 and motor 118 to engage direct drive clutch 101 thereby establishing the low ratio in the splitter unit. In fourth ratio, the supply port 241 supplies line 262 and motor 152 to engage brake 144 to establish the intermediate ratio in the rear unit and supply ports 246 and 248 are connected, respectively, to lines 264 and 264' to engage splitter high. In third ratio, the connection to intermediate line 262 remains the same and supply port 253 is connected to line 266 to engage splitter low. For second ratio, supply port 241 is connected to supply line 261 and motor 187 to engage brake 181 thereby establishing low ratio in the rear unit and fluid is supplied via supply port 246, branch 264' and line 264 to engage splitter high. In first ratio, the connection to rear unit low ratio remains the same and the main line 204' is connected by the space between the lands *a* and *b* to line 266 to engage splitter low and also by supply port 256 to signal line 222. In neutral, fluid is connected by the space between the lands *a* and *b* to the splitter low line 266. In reverse, splitter low remains engaged as in neutral and first ratio, and supply port 256 is connected to reverse line 267 and motor 203 to engage reverse brake 197 thereby establishing reverse ratio in the rear unit, and supply port 253 is connected to signal line 222 to boost main line pressure. In each of the above valve positions, the other lines are connected via exhaust ports to the exhaust bore 132 to exhaust.

The lockup shift valve 271 has a valve element 272 having lands *a* and *b* of uniform diameter located in the bore 273 in the valve body. The bore is closed at both ends and a spring 274 located in one end of the bore urges the valve to the closed position shown in which the land *a* blocks the main line 204 and connects lockup clutch supply line 276 to exhaust 277. The governor line 121 supplies fluid at a pressure proportionate to the output speed of the torque converter to the other end of the bore 273 where the fluid acts on land *b* of valve element 272 to move the valve to the lockup portion in which line 204 is connected between the lands *a* and *b* to the lockup clutch supply line 276 and the land *b* closes the exhaust 277.

Main line 204 is also connected to the flow wave 281 which has a valve element 282 having land *a* of large diameter and a narrow land *b* of small diameter closely adjacent land *a* and a second land *c* of the same small diameter substantially spaced from the other lands. The valve element 282 is slidably mounted in a bore 283 having a large diameter portion fitting land *a* and small diameter portion fitting lands *b* and *c*. The overall length of the lands *b* and *c* including the space between is substantially equal to the length of the small bore portion 284. The width of land *b* is substantially equal to the width of exhaust port 286. The main line 204 is connected freely around land *c* and through an orifice 287 to the main line 204'. The main line 204 is also connected to the end of valve bore 284 to act on the land *c* to move the valve to the left to the exhaust position in which lockup clutch line 291 is connected to exhaust 286 venting line 291 to disengage the lockup clutch 11. To prevent fluid lock during this movement of the valve, the space between lands *a* and *b* is connected to exhaust 286. In the normal position shown, the land *b* of valve 282 blocks the exhaust 286 and lockup supply line 276 is connected to lockup clutch line 291 to engage the lockup clutch 11 if the lockup shift valve 271 has upshifted. The valve 282 is moved to the exhaust position whenever there is flow from the main line 204 to the main line 204' through orifice 287. This occurs during each ratio change when a fluid motor is filled to engage a clutch or brake. When the clutch engagement is completed, the flow through orifice 287 ceases and the pressure in lines 204' and 204 equalizes since there is now flow through orifice 287. Fluid is also supplied through the orifice 293 in the check valve 294 to fill the bore 296 so the same pressure acts on both ends of the valve 282. Since the land $\bar{a}$ is larger than the land *c*, the valve element will be moved to the right or closed position. The orifice 293 delays the flow of fluid from line 204' to the valve bore 296 to delay return movement of valve 282, sufficiently, so that the ratio change clutch or brake is fully engaged to establish a new ratio before the lockup clutch 11 is again engaged. The check valve 294 permits rapid exhaust of the bore portion 296 as the flow valve moves from the closed to the exhaust position so that the lockup clutch will be disengaged quickly as the shift is initiated so that during the entire period of the shift, the convertor will be effective to absorb any shift load shocks.

The convertor supply line 213 supplies fluid from the pressure regulator valve 206 to the torque convertor. Then the fluid flows from the convertor to outlet line 301 to the convertor outlet relief valve 302 and to the cooler 303.

The relief valve 302 is placed between convertor inlet line 213 and convertor outlet line 301 and is operative to open in response to a low pressure, i.e., 3 p.s.i. to permit flow from the convertor inlet line 213 to the convertor outlet line 301 when a pressure differential of more than 3 p.s.i. exists. During the torque multiplication phase of operation of the convertor, the outlet pressure is sufficiently high compared to the inlet pressure to close valve 302 and insure fluid flow through the convertor. During the coupling phase, due to the reduction of pumping action, the outlet pressure is reduced permitting valve 302 to open to bypass fluid directly from the inlet line to the outlet line.

The color outlet line 304 supplies fluid from the torque convertor to the hydrodynamic brake when the brake control valve 306 is in the brake-on position shown in FIG. 2a. The brake control valve 306 has a valve element 307 having lands *a*, *b* and *c* of equal diameter located in the bore 308 in the valve body. With the brake valve 306 in the brake-on position shown, the brake outlet line 309 is connected to annular port 311 between the lands *a* and *b* to the cooler inlet port 312 and line 301 to cooler 303. The fluid from the cooler passes through line 304 to cooler outlet port 313 between the lands *b* and *c* to the brake inlet port 314 and line 316 to supply fluid to the brake chamber 76 to apply the hydrodynamic brake. The brake outlet port 311 is also connected to a pressure relief valve 318. Since the torque absorbed by a hydrodynamic brake, having a central inlet and an outer outlet is proportionate to the pressure in brake outlet line 309, the valve 318 limits the torque absorbed by the brake by relieving excess pressure by venting the brake outlet flow from port 311 to a drain passage 319 which is connected by the tube 321, chamber 322, and passage 323 extending around land c of valve element 307 to exhaust 324. The cooler outlet port 313 is connected by passage 326 concentric with tube 321 to a low pressure check valve 327, i.e., 2 p.s.i. which regulates the brake inlet pressure and opens at 2 p.s.i. to supply the convertor and lube lines. When the pressure in the cooler outlet port 313 raises above a predetermined value, i.e., 22.5 p.s.i., relief valve 328 opens and fluid is exhausted through passage 329 connected to chamber 326 and port 313.

When the valve element 307 is moved by biasing spring toward the brake-off position, land a first uncovers the apex of triangular port 331 and then increasing areas of port 331 to provide a variable orifice connection from brake outlet line 309 to vent port 332. This variable orifice control provides auto-regulation of the torque absorbed by the brake at intermediate values since an increase in the torque absorbed will increase the outlet pressure and flow through the orifice to reduce the volume of fluid in the brake chamber, the outlet pressure and flow and the torque absorbed and a decrease in the torque absorbed will similarly increase the torque absorbed, as explained in detail in the U.S. Pat. No. 2,864,473 to Christenson et al. Seal 333 closes the upper opened end of the bore 308. There is a small clearance between the lands of valve 307 and bore 308 so that the fluid in the ends of the bore does not block movement of valve 307. When the valve element 307 is in the brake-off position with the land a engaging stop ring 334, the brake outlet line 309 and port 311 are connected between the lands a and b without restriction to the vest port 332 which is connected via passage 319, tube 321, chamber 322 and passage 323 to exhaust 324 to fully evacuate the brake chamber. The land b blocks the connection between the brake outlet port 311 and bore 308 so that the brake outlet line 309 is not connected to the cooler and also prevents oil from the cooler inlet line 301 entering the valve bore 308. The land c also blocks the connection between the cooler outlet port 313 and the brake inlet port 314 and thus stops the supply of fluid to the brake inlet line 316. Since the cooler outlet port 313 extends around the land c, the cooler outlet line 304 remains connected to the passage 326 and via check valve 327 to convertor inlet line 213 and relief valve 328 which will limit excessive convertor outlet pressure by exhausting excess fluid to exhaust as explained above.

The manual valve 225 is manually operated through a control lever 341 which is connected to the actuating portion 231 of valve member 226 by a control rod 342. The control rod 342 is also connected to a slave piston 343 which is slidably disposed in a slave cylinder 344 which is closed at both ends and cooperates with the slave piston 343 to form two expansible control chambers 346 and 347. The control rod 342 extends through both ends of the slave cylinder so that the control chambers 346 and 347 have equal end wall and piston area. The chamber 346 is connected via line 348 to a relief valve 349, a check valve 351, and a port 352 of a pilot operated directional valve 353. The valve 353 also has ports 354 and 356 which are connected respectively to the check valve 351 and, via line 357, to a port 358 of a pilot operated directional valve 359. The directional valve 353 also has a pilot port 361 connected to the lockup clutch line 291 and a bias spring 362 operative to maintain the valve 353 in the unshifted position shown when the lockup clutch line 291 is not pressurized. The directional valve 359 also has a port 363 connected to main line 204, a pilot port 364 connected to the brake outlet line 309 and a bias spring 366 operative to maintain the valve 359 in the unshifted position shown when the brake outlet line 309 is not pressurized.

The control chamber 347 is connected via line 367 to port 368 of a pilot operated directional valve 369 which also has a port 371 connected to main line 204, a pilot port 372 connected to the brake outlet line 309 and a bias spring 373 which maintains the valve 369 in the unshifted position shown when the brake outlet line 309 is not pressurized.

Thus, when the directional valves 353, 359 and 369 are in the position shown, both control chambers 346 and 347 are open to main line 204 so that the piston 343 is pressure balanced and the lines 348 and 367 provide a recirculating passage from chamber 346 and 347 and vice versa. When the piston 343 is balanced, the control lever 341 can be freely moved by the operator to cause the manual valve 225, and the transmission controlled thereby, to be upshifted or downshifted as desired. When the hydrodynamic brake 12 is activated by the operator, the line 309 is pressurized, as described above, thereby causing the directional valves 359 and 369 to be shifted so that the fluid in chambers 346 and 347 is trapped. The trapped fluid is relatively incompressible, therefore, any attempted movement of the control lever 341, by the operator will result in an increase in pressure of the fluid acting on one side or the other of the piston 343 to resist an upshift or downshift. Thus, the transmission will remain in the ratio selected prior to activation of the hydrodynamic brake 12 until the brake is deactivated or the pressure of the fluid in brake outlet line 309 decreases sufficiently to permit the valves 359 and 369 to return to their unshifted positions.

When the lockup clutch 11 is engaged, as described above, the lockup clutch line 291 is pressurized thereby shifting the directional valve 353. When the valve 353 is shifted, the control chamber 346 can receive fluid via passage 357, ports 356 and 354, check valve 351 and passage 348. However, the fluid in control chamber 346 cannot be removed since the port 352 of valve 353 is closed and check valve 351 permits fluid flow in one direction only. Therefore, the operator may freely upshift the transmission when the lockup clutch 11 is engaged, but any downshift attempt is inhibited by the fluid trapped in chamber 346.

In the event that an emergency condition, which requires a downshift, arises, a hydraulic detent in the form of relief valve 349 has been provided. To force a downshift, when any or all of the directional valves 353, 359 or 369 are shifted, the operator merely applies sufficient force to the control lever 341 so that the pressure in chamber 346 will rise a sufficient amount to open the relief valve 349 thereby permitting the fluid in chamber 346 to be forced through the relief valve 349 to exhaust. Preferably, the relief valve 349 is adjustable to provide a variable detent, the operating characteristics of which may be varied to conform to the desires of the operator.

Obviously many variations and modifications of the present invention are possible in view of the above teachings. It is therefore understood that within the scope of the appended claims, the invention may be practiced otherwise than as specifically described.

What is claimed is:

1. In a transmission; input means; output means; drive establishing and retarding means operatively connected between said input and output means including engageable lockup clutch means for providing a drive and hydrodynamic brake means operative to provide a brake between said input and output means; and control means for controlling said drive establishing and retarding means including shift means having a moveable manual shift valve; and shift inhibitor means, operatively connected to said manual shift valve and hydrodynamic brake means, to prevent movement of said manual shift valve when said hydrodynamic brake is operative.

2. The invention defined in claim 1 and said inhibitor means being operatively connected to said lockup clutch means to prevent movement of said manual shift valve in one direction while permitting movement of said manual shift valve in another direction when said lockup clutch is engaged.

3. The invention defined in claim 2 and said inhibitor means including detent means for permitting movement of said manual shift valve in said one direction when said hydrodynamic brake is operative and said lockup clutch is engaged.

4. In a transmission; input means; output means; drive establishing and retarding means operatively connected between said input and output means including engageable lockup clutch means for providing a drive and hydrodynamic brake means operative to provide a brake between said input and output means; and control means including manual shift valve means, lockup clutch valve means moveable to engaged and disengaged positions for controlling the lockup means, hydrodynamic brake valve means having an open and closed position for controlling said hydrodynamic brake means, and shift inhibitor means including first valve means operatively connected to said hydrodynamic brake valve means, expansible chamber means operatively connected to said manual shift valve means, and recirculating passage means operatively connected to expansible chamber means through said first valve means; said first valve means providing free fluid flow in said recirculating passage means when said hydrodynamic brake valve means is in the closed position and preventing fluid flow in said recirculating passage means when said hydrodynamic brake valve means is in the open position to create a fluid lock in said expansible chamber means to inhibit movement of said manual shift valve means.

5. The invention defined in claim 4 and said shift inhibitor means further including second valve means in a portion of said recirculating passage means between said expansible chamber means and said first valve means, operatively connected to said lockup clutch valve means, for preventing fluid flow in said recirculating passage means in one direction when said lockup clutch valve means is moved to the engaged position to inhibit movement of said manual shift valve means in one direction.

6. The invention defined in claim 5 and said shift inhibitor means further including detent valve means operatively connected to said recirculating passage means, between said expansible chamber means and said second valve means, for exhausting fluid from said recirculating passage means to permit movement of said manual shift valve means in said one direction when sufficient force is applied to said manual shift valve means irregardless of the position of said hydrodynamic brake valve means and said lockup clutch valve means.

7. A transmission and control including input means; output means; multi-ratio drive establishing means for operatively connecting said input and output means including a lockup clutch means and hydrodynamic brake means; manual shift control means movable for providing ratio change in said drive establishing means; lockup clutch shift means for engaging said lockup clutch means independent of said manual shift control means; hydrodynamic brake valve means having an open and closed position for controlling said hydrodynamic brake means; inhibitor means operatively connected to said manual shift control means; and control passage means, operatively connected between said hydrodynamic brake valve means and said inhibitor means, for operating said inhibitor means to prevent movement of said manual shift control means when said hydrodynamic brake valve means is in the open position.

8. In a transmission; input means; output means; multi-ratio drive establishing means operatively connected between said input and output means including engageable lockup clutch means for providing drive ratios between said input and output means, and hydrodynamic brake means selectively operable for providing a brake between said input and output means; and control means for controlling said drive establishing means including shift means having shift valve means operative to engage and disengage said lockup clutch means, hydrodynamic brake valve means for controlling said hydrodynamic brake means, and a moveable manual shift valve for providing drive ratio change in said multi-ratio drive establishing means; and shift inhibitor means, operatively connected to said manual shift valve, said hydrodynamic brake means and lockup clutch means to prevent movement of said manual shift valve in one direction when said lockup clutch means is engaged, and to prevent movement of said manual shift valve when said hydrodynamic brake is operable.

References Cited
UNITED STATES PATENTS

| | | | |
|---|---|---|---|
| 3,053,116 | 9/1962 | Christenson et al. | 74—752 |
| 3,146,630 | 9/1964 | Ivey | 74—732 |

BENJAMIN W. WYCHE, III, Primary Examiner

U.S. Cl. X.R.

192—3.5, 12, 3.23; 74—732; 137—637.1 637; 188—90

PO-1050
(5/69)

UNITED STATES PATENT OFFICE
CERTIFICATE OF CORRECTION

Patent No. 3,524,523          Dated August 18, 1970

Inventor(s) Walter R. Klimek and Joseph A. Bednar

It is certified that error appears in the above-identified patent and that said Letters Patent are hereby corrected as shown below:

```
Column 1, line 61, delete "Fibs." and insert -- Figs. --;
Column 2, line 17, delete "cylnidri-" and insert
                   -- cylindri- --;
          line 66, delete "drive" ;
Column 3, line 26, delete "pistons" and insert -- pinions --;
          lines 55 and 56, delete "three-speed unit by a
                   brake 181 which has a set of plates" ;

Column 5, line 67, delete "portion" and insert -- position --;
          line 71, delete "wave" and insert -- valve -- ;
Claim 4,  line 19, -- clutch -- should be inserted before
                   means.
```

SIGNED AND
SEALED
JAN 5 1971

(SEAL)
Attest:

Edward M. Fletcher, Jr.
Attesting Officer

WILLIAM E. SCHUYLER, JR.
Commissioner of Patents